US 007684387B2

(12) United States Patent
Salkintzis

(10) Patent No.: US 7,684,387 B2
(45) Date of Patent: Mar. 23, 2010

(54) METHOD FOR ROUTING COMBINATIONAL SERVICES TO A SINGLE ENDPOINT

(75) Inventor: Apostolis K. Salkintzis, Athens (GR)

(73) Assignee: Motorola, Inc., Schaumburg, IL (US)

( * ) Notice: Subject to any disclaimer, the term of this patent is extended or adjusted under 35 U.S.C. 154(b) by 417 days.

(21) Appl. No.: 11/539,324

(22) Filed: Oct. 6, 2006

(65) Prior Publication Data

US 2008/0084885 A1 Apr. 10, 2008

(51) Int. Cl.
*H04L 12/66* (2006.01)
(52) U.S. Cl. .................. 370/352; 370/401; 370/328
(58) Field of Classification Search .............. None
See application file for complete search history.

(56) References Cited

U.S. PATENT DOCUMENTS

| 2005/0073997 | A1* | 4/2005 | Riley et al. ................ 370/352 |
| 2005/0246419 | A1* | 11/2005 | Jaatinen ..................... 709/204 |
| 2006/0056392 | A1* | 3/2006 | Wang ........................ 370/352 |
| 2006/0092925 | A1* | 5/2006 | Svensson et al. ........... 370/352 |
| 2006/9221176 | | 10/2006 | DiPietro et al. |
| 2007/0201441 | A1* | 8/2007 | Buckley ..................... 370/356 |
| 2007/0280202 | A1* | 12/2007 | Hamel et al. .............. 370/352 |
| 2007/0297390 | A1* | 12/2007 | Skog et al. ................. 370/352 |
| 2008/0056235 | A1* | 3/2008 | Albina et al. .............. 370/352 |

FOREIGN PATENT DOCUMENTS

EP 0821510 A2 1/1998
WO 2006037375 A 4/2006
WO 2006059353 A 6/2006

OTHER PUBLICATIONS

3GPP; 3rd Generation Partnership Project; Technical Specification Group Services and System Aspects; Study on Handling the Termination of Real-Time Sessions and Calls (Release 7); TR 23.819 V1.2.0 (Sep. 2006) Technical Report (Markup); 37 pages.
3GPP; 3rd Generation Partnership Project; Technical Specification Group Services and System Aspects; Combining Circuit Switched (CS) and IP Multimedia Subsystem (IMS) Services;(Release 7); TS 23.279 V7.3.0 (Jun. 2006) Technical Specification; 22 pages.
Counterpart PCT Application No. PCT/US2007/078393; Search Report; Jan. 31, 2008; 11 pages.

* cited by examiner

*Primary Examiner*—Bob A Phunkulh
(74) *Attorney, Agent, or Firm*—Gary J. Cunningham

(57) ABSTRACT

A method for routing a plurality of calls to a single endpoint of a plurality of endpoints at a common destination is disclosed. The method comprising the steps of: initiating (202) a call over a first network (118) having a first network type, the call being directed to a destination (106) that has a plurality of endpoints 108, 110, 112, 114. Establishing (204) the call over the first network with a first final endpoint (108) of the plurality of endpoints. Receiving (206) a temporary endpoint identifier. Initiating (208) a second call to the destination by sending a request message for a second call of a second network (120), having a second network type, the request message including the temporary endpoint identifier. Establishing (210) the second call, simultaneously with the first call, over the second network with the same final endpoint.

11 Claims, 2 Drawing Sheets

METHOD FOR ROUTING COMBINATIONAL SERVICES TO A SINGLE ENDPOINT

FIELD OF THE DISCLOSURE

This disclosure relates generally to routing multiple call types to a single endpoint at a destination that has a plurality of endpoints.

BACKGROUND OF THE DISCLOSURE

Wireless data continues to proliferate to wireless networks as well as wired or optical networks. As high speed data such as multimedia and internet protocol services evolve to wireless networks, combinational services that utilize multimedia sessions (e.g. voice and video sharing) provided across different network domains are also emerging. For example, the 3GPP standard defines combinational services as the combination of circuit switched (CS) domain and IP Multimedia Subsystem (IMS) services. The IMS, in general, is a standardized networking architecture that uses a Voice-over-IP (VoIP) implementation based on a 3GPP standardized implementation of SIP. IMS runs over the standard Internet Protocol supporting both packet-switched and circuit-switched systems.

Combinational services provide a method to route two different types of calls over two different types of networks (CS and packet switched (PS)/IMS). However, where a network routes a first call to a destination that further routes the call to one of a plurality of final endpoint, such as a specific agent in a call center for example, the mobile station initiating the call will not know the final endpoint in order to direct the second call to the same endpoint. Therefore the user can not initiate an IMS session to the same endpoint as the identification of the exact endpoint with the call center is not known. A method does not exist for a user to establish combinational services with a call center, i.e. having a destination characterized by a plurality of final endpoints.

The various aspects, features, and advantages of the disclosure will become more fully apparent to those having ordinary skill in the art upon careful consideration of the following Drawings and accompanying Detailed Description.

DETAILED DESCRIPTION

A method for routing a plurality of call types to a single endpoint of a plurality of endpoints at a common destination is disclosed. The method comprising the steps of: initiating a first call over a first network having a first network type, the call being directed to a destination that has a plurality of endpoints. Establishing the first call over the first network with a final endpoint of the plurality of endpoints. Receiving a temporary final endpoint identifier. Initiating a second call, simultaneously with the first call, to the same destination by sending a request message for a second call of a second network, having a second network type, the request message including the temporary final endpoint identifier.

Figure 1:
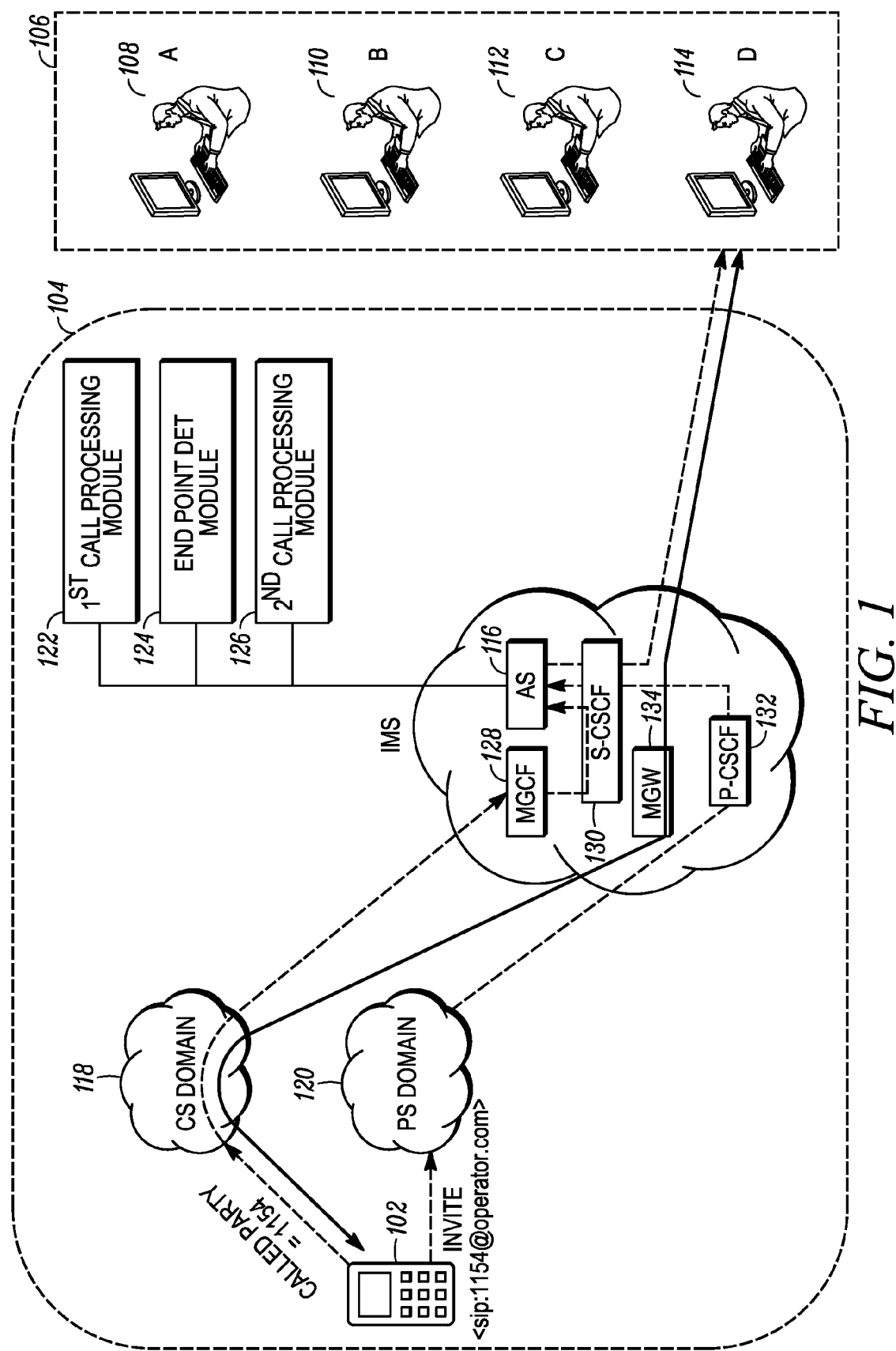
FIG. 1 shows a combinational services network according to an embodiment.

FIG. 1 illustrates an exemplary diagram for a multiple call, single endpoint network. In this embodiment, an originating terminal 102 communicates with a network 104 in order to place calls with a desired destination 106. For example, the user of the terminal dials an 800 toll free number for a customer support center. One phone number is associated with the customer support center such as 1-800-support. The destination 106 includes a plurality of final endpoints where the incoming call from the user can be directed. For example, in the embodiment shown in FIG. 1, there are four support agents to receive calls routed to the destination. In the network 104, the four agents are at endpoints, a first endpoint 108, a second endpoint 110, a third endpoint 112 and a fourth endpoint 114. It is understood that there may be more endpoints and only four are used for simplicity in this example.

The network 104 may be a combination of networks having different network types. In this embodiment, the network types include a circuit switched network 118 and a packet switched network 120. It is understood that other types of networks may make up the network and the network types may be more than two. Therefore the network 104 may have a first network type and a second network type; and the network may have additional types for which the terminal may communicate.

The network 104 includes an IP Multimedia Subsystem (IMS) portion 115. Included in the IMS 115 is an Application Server 116, a media gateway controller function (MGCF) 128, a Serving Call/Session Control Function (S-CSCF 130), a media gateway (MGW) 134, and a Proxy CSCF (P-CSCF) 132. The IMS 111 portion of the network may also include other entities as understood by one of ordinary skill in the art, however these are not included here for simplicity.

The application server 116 in one embodiment includes a first call processing module 122 that processes a first call from the originating terminal 102 to the destination 106 as requested by the originating terminal 102. IN this embodiment the first call is over a CS type network. The application server 116 includes an endpoint determination module 124 that determines the final endpoint (one of 108, 110, 112, 114) of the connection between the originating terminal and the final endpoint of the destination which has a plurality of endpoints.

The endpoint determination module 124 also generates a temporary endpoint identifier (TEI) for the determined endpoint in this embodiment. In one embodiment, the first call processing module sends the TEI to the originating terminal 102. In another embodiment, a TEI routing module (not shown) receives the TEI from the endpoint determination module and sends the TEI to the originating terminal 102. The application server 116 includes a second call processing module 126 that processes the second call, simultaneously with the first call over a second network, to the final endpoint 108 for example. In this embodiment, the second call is placed over a PS type network.

Figure 2:
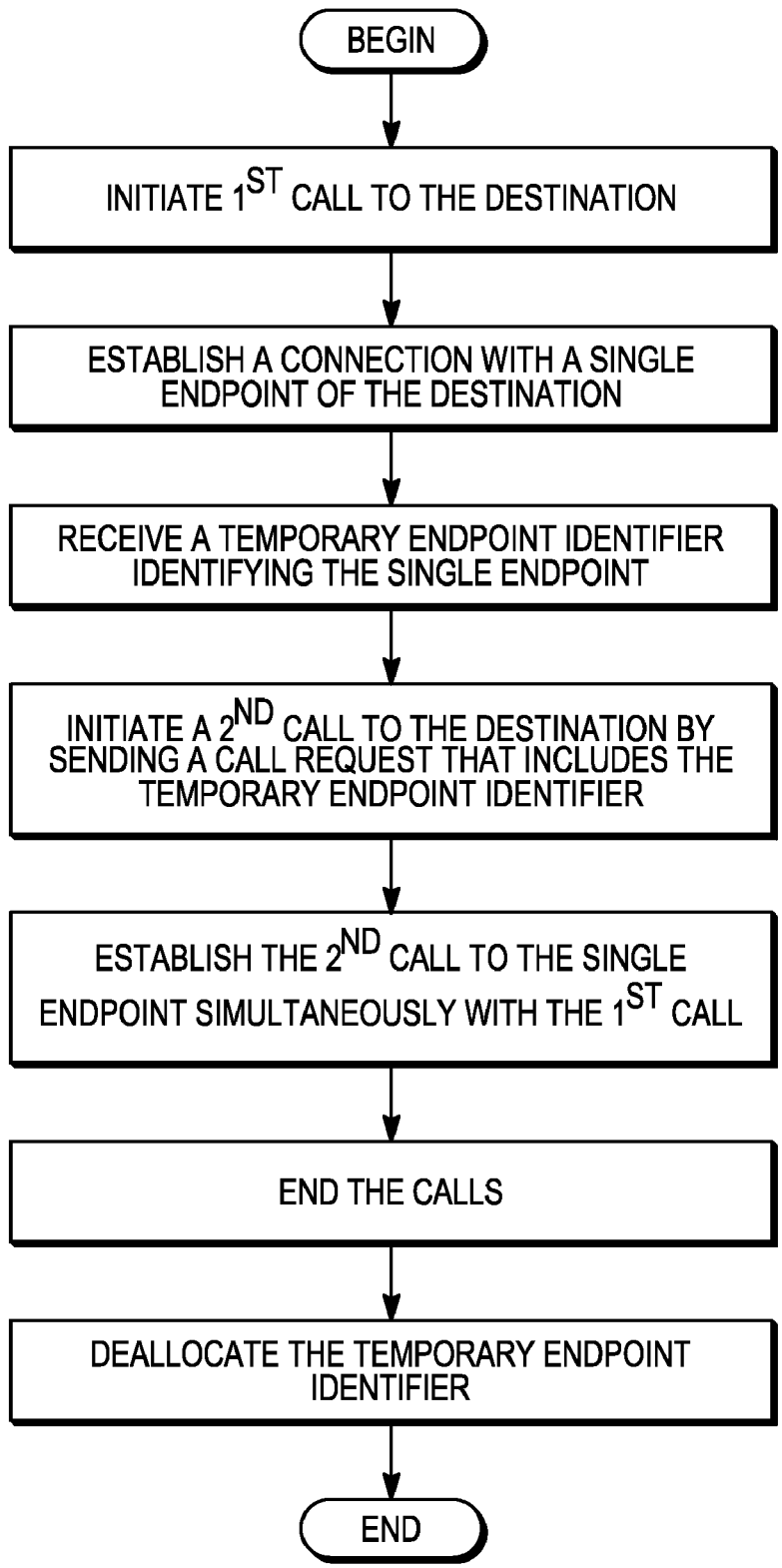
FIG. 2 shows a flow diagram for routing calls to a single endpoint according to an embodiment.

FIG. 2 illustrates and exemplary flow diagram for routing multiple calls to a single endpoint of a common destination. In this embodiment, the first call is initiated 202 by the originating terminal 102 to the destination 106. Then the call is established 204 with (i.e. routed to) a first endpoint 108 of the plurality of endpoints (108, 110, 112, 114) of the destination 106. The first call in this embodiment is routed to the final endpoint 108 by the application server 116. The method further includes initiating 206 a second call to the final endpoint 108 by sending a second call request, that includes a temporary endpoint identifier, which identifies the first (final) endpoint 108. Then, establishing 208 with the first endpoint 108 of the plurality of endpoints (108, 110, 112, 114) the second call, simultaneously with the first call. Once the call has ended 210, the temporary endpoint identifier may be deallocated 212. In this embodiment, the first call is a voice call and the second call is a video call. One example of a common destination is a service or support center that has a common phone number and a plurality of operators standing by to handle a plurality of calls.

In this embodiment, the caller may have called the support center which is the voice call routed over the circuit switch network 118 to one operator, of a plurality of operators standing by, at the support center. The second call established by the caller is a video call routed over the packet switched network 120 to the same operator at the help center. In this embodiment, once the voice call has ended 210, the temporary final endpoint identifier is deallocated 212 by the application server 116.

The temporary endpoint identifier may be generated by the application server 116. It is to be understood that the temporary endpoint identifier may be generated by other entities in the network and at other locations within the network. In this embodiment the endpoint determination module of the application server 116 generates the temporary endpoint identifier.

The temporary endpoint identifier is generated in order to inform the originating terminal 102 of the exact endpoint to which the first call has been established with at the destination in order to establish a call over the second network. In this embodiment, the temporary endpoint identifier is generated as a general numeric string of numbers such as a phone number for example.

Once the temporary endpoint identifier has been generated, it is sent to the originating terminal 102. The temporary endpoint identifier may be sent immediately after it has been generated or it may be sent in response to an event. In this embodiment, the temporary endpoint identifier is sent to the originating terminal 102 once it is generated and as a part of the process for establishing the first call. In this embodiment, the temporary endpoint identifier is sent in a connect message associated with the first call placed by the originating terminal 102. The connect message is sent back to the originating terminal establishing the connection for the first call and communicating the temporary endpoint identifier.

In another embodiment, the application server 116 uses Session Initiation Protocol (SIP) signaling to communicate the temporary endpoint identifier. The temporary endpoint identifier is provided in the P-Asserted-identity of the SIP 200 OK message sent from the application server 116, in this embodiment. It is understood that the P-Asserted identity of the SIP 200 OK message is known to those skilled in the art. It is also understood that the SIP 200 OK message, and the other incoming and outgoing support messages are exemplary connect message and that those of ordinary skill in the art realize there are other possibilities for connect messages. The P-Asserted-identity, and hence the temporary endpoint identifier, are communicated over the switched network portion 118. The temporary endpoint identifier is transferred from the P-Asserted identity at the MGCF 128 to a connect message which is sent to the originating terminal 102. The originating terminal 102 stores the temporary endpoint identifier 102 and sends the temporary endpoint identifier over the packet switched network portion 120 when establishing the second call to the destination.

In yet another embodiment, the temporary endpoint identifier is generated by the AS 116 and sent during an Unstructured Supplementary Service Data (USSD) session. This is a service used in a GSM or UMTS network with which a mobile terminal and a network server (the AS in this embodiment) to exchange data. In this embodiment, the temporary endpoint identifier is generated as discussed above for example.

In still yet another embodiment, the temporary endpoint identifier is sent in a short messaging service message (SMS) to the originating terminal 102. The SMS message includes the temporary endpoint identifier which is then stored in the originating terminal in this embodiment.

In yet another embodiment, the temporary endpoint identifier is requested by the originating terminal 102 by sending a HTTP or WAP request to the application server 116 subsequent to establishing a circuit switched voice call, i.e. the first call. In this embodiment, the originating terminal sends a WAP or HTTP request to a preconfigured server address, preconfigured in the originating terminal, to request the TEI associated with the first call. When the AS 116 receives an http request from a terminal (i.e. originating terminal), the AS 116 responds back with a stored TEI that is associated with the ongoing CS call of this terminal.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

As understood by those in the art, an application server includes a processor that executes applications having computer program code to implement the methods described herein. Embodiments include computer program code containing instructions received from tangible media, such as floppy diskettes, CD-ROMs, hard drives, or any other computer-readable storage medium, wherein, when the computer program code is loaded into and executed by a processor, the processor becomes an apparatus for practicing the invention. Modules may be physical modules that coupled to a processor or software modules that are executed within a processor. A physical module may be comprised of both hardware and software. The module may be a hardware module that executes computer program code stored in a device coupled to the module.

Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

I claim:

1. A method for routing a plurality of call types from a single originating device comprising:
   initiating a first call, over a first network having a first network type, the call directed to a destination that has a plurality of final endpoints;
   establishing the first call with a final endpoint of the plurality of endpoints of the destination;
   receiving a temporary final endpoint identifier that identifies the final endpoint of the plurality of endpoints of the destination;
   initiating a second call to the destination by sending a request message for a second call over a second network, having a second network type, the request message including the received temporary final endpoint identifier; and
   establishing the second call, simultaneously with the first call, over the second network with the final endpoint.

2. The method of claim 1, further comprising deallocating the temporary final endpoint identifier when the first call is terminated.

3. The method of claim 1, further comprising receiving the temporary final endpoint identifier in a connect message for the first call.

4. The method of claim 3, further comprising including the temporary final endpoint identifier in a P-asserted-identity header of a SIP message.

5. The method of claim 1, further comprising receiving the temporary final endpoint identifier during an Unstructured Supplementary Service Data (USSD) session.

6. The method of claim 1 further comprising receiving the temporary final endpoint identifier in a short message service (SMS) message.

7. The method of claim 1, further comprising requesting the temporary final endpoint identifier in a WAP/HTTP request.

8. The method of claim 1, wherein the first call is routed to an application server, that forms at least part of a network infrastructure, wherein an application server generates the temporary endpoint identifier.

9. The method of claim 1, wherein the second call is routed to an application server, that forms at least part of a network infrastructure, wherein an application server routes the second call based on the generated temporary endpoint identifier.

10. An application server for routing a plurality of calls to a single endpoint of a destination that includes a plurality of endpoints comprising:
    a first call processing module that processes a first call from an originating terminal to a destination requested by the originating terminal;
    an endpoint determination module that determines the final endpoint of the connection between the originating terminal and the final endpoint to a destination that has a plurality of endpoints;
    a temporary endpoint identifier module for generating a temporary endpoint identifier that identifies the final endpoint of first call;
    receiving a second call request, simultaneous to the first call, the second call request having the temporary endpoint identifier; and
    a second call processing module that routes the second call, to the final endpoint.

11. The application server of claim 10, comprising a temporary endpoint identifier transmission module coupled to the originating terminal, communicating the temporary endpoint identifier.

* * * * *